April 20, 1937.  A. R. FERGUSSON  2,078,132

SEAL FOR RECEPTACLES

Filed June 3, 1935

INVENTOR.
A. R. Fergusson
BY John O. Seifert
ATTORNEY

Patented Apr. 20, 1937

2,078,132

UNITED STATES PATENT OFFICE 2,078,132

SEAL FOR RECEPTACLES

Alan R. Fergusson, New Rochelle, N. Y., assignor to Crown Cork & Seal Company, Inc.

Application June 3, 1935, Serial No. 24,649

14 Claims. (Cl. 215—38)

This invention relates to seals for closure caps for receptacles, such as vials, bottles and jars, and it is the principal object of the invention to provide an improved seal to effect a multiple sealing of the receptacle.

It is a further object of the invention to provide a composite seal for closures for receptacles comprising a packing member of cushion material to effect an air and moisture tight seal of the receptacle and a member of gas impervious and acid resisting material to seal the contents of the receptacle from said packing member.

Soft rubber has been found to be the most effective form of packing for sealing closure caps for receptacles. However, the use of rubber has heretofore been almost entirely prohibited as a seal for closure caps for receptacles since it cannot be used in sealing receptacles containing certain substances, such as oils, alcohol, or liquids having an alcoholic content, food commodities and volatile substances, due to the fact that such contents of receptacles, or the vapors thereof, coming in contact with the rubber effects a chemical reaction that results in the deteriorating of the rubber and destroying of the seal and the further deleterious result of contaminating and spoiling the contents of the receptacles.

It is another object of the invention to provide a composite seal to overcome the above disadvantages comprising a disk of sealing material of a diameter to engage the inner portion of the lip about a receptacle mouth and having a facing applied to the face thereof to be exposed to the contents of the receptacle having the properties of being impervious to gas, such, for instance, as carbonic acid gas, and acid resisting, and a rubber packing member embracing the peripheral portion of the disk of sealing material and adapted to engage the outer portion of the lip about the receptacle mouth and sealed from the contents of the receptacle by the disk of sealing material, and to provide a seal of this character that is simple and cheap in construction and efficient in use.

It is a further object of the invention to provide a seal for closure caps for receptacles comprising a disk of resilient rubber having a recess in one face, and a disk of sealing material seated in the recess of the rubber disk and united to the rubber disk by the resiliency of the material thereof.

Other objects and advantages will hereinafter appear.

In the drawing accompanying and forming a part of this application, Figure 1 is a side elevation of the neck portion of a receptacle with a closure cap embodying my improved seal applied thereto, and partly broken away to show the arrangement of the parts and sealing of the receptacle by the seal.

Figure 2:
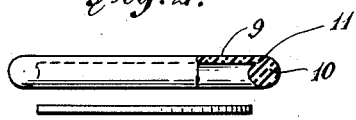
Figure 2 is a side elevation of the component parts of the seal shown in Figure 1 in disassembled relation and one part shown partly in section.
Figure 3:
Figure 3 is a cross sectional view of the assembled seal shown in Figure 2.
Figure 4:
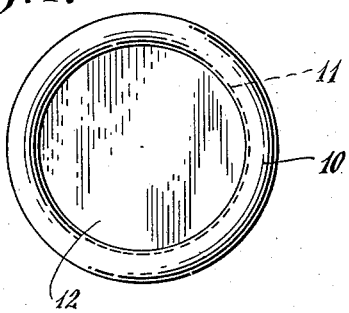
Figure 4 is a view looking at the bottom of Figure 3.

In the embodiment of the invention shown in Figures 1 to 4, the seal comprises a disk 9 of resilient rubber having a recess in one face formed by arranging the peripheral portion of the disk of increased thickness relative to the remainder of the disk, as at 10, said portion of increased thickness of the disk preferably being in the form of a bead of round or circular form in cross section with the disk portion of less thickness extending substantially tangential to a peripheral portion of the bead and thereby arranging the recess with a portion of greater diameter at the juncture of said bead with the disk, as at 11, than the immediate adjacent portion of the bead or recess wall. Thus, it will be seen that the portion 11 of the recess provides a circumferential groove.

A liner or sealing pad of disk form 12 of a suitable material, preferably of paper, is engaged in the grooved portion 11. The disk 12 is snapped into the recess by applying pressure thereto, thereby effecting an expansion of the portions 10, 11 of the sealing member 9. When the disk 12 is thus engaged within the circumferential groove 11, its periphery is embraced and grippingly engaged by the portion 10 of the sealing member 9, and, as a result of the resilient contracting force of the annular portion 10, the disk 12 is held in contiguous relation to the disk 9. It will be noted that portions of the sealing member above and below the groove 11 are projected inwardly beyond the edge of the liner disk 12 and that these contact the upper and lower faces of the disk along lines at that edge to assist in holding the disk in place.

Figure 1:
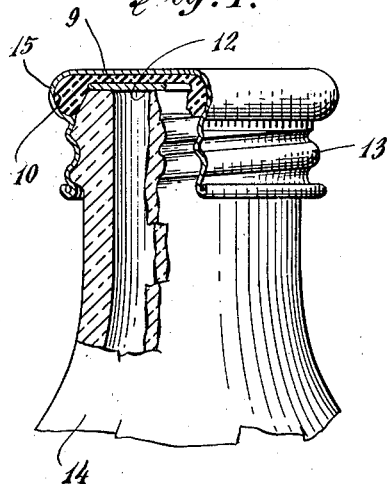

The seal is assembled or engaged in a closure cap 13 to be applied to the mouth of a receptacle 14, and when the cap is of a type having a skirt provided with a locking device in the form of a screw thread to have screw threaded connection with a locking device or screw thread on the neck of the receptacle, as shown in Figure 1, the portion of the closure cap at the juncture of the skirt with the end wall of the cap is preferably made of increased diameter, as shown at 15. The disk 12 has a diameter or circumference less than the outer circumference of the receptacle mouth and greater than the inner circumference of the receptacle mouth, so that the peripheral portion of the disk will contact with the inner portion of the lip about the receptacle mouth, as clearly shown in Figure 1. The rubber disk has a diameter or circumference as great as the outer circumference of the receptacle mouth, but preferably, as shown in Figure 1, is of a circumference greater than the outer circumference of the receptacle mouth to overhang the periphery of the disk 12 and contact with the outer portion of the lip about the receptacle mouth. As the closure cap is drawn to the receptacle mouth the peripheral portion of increased thickness of the rubber pad 9 will be pressed into firm contact with the lip of the receptacle mouth and conform itself to any irregularities therein, and thus positively air and moisture sealing the receptacle, and the disk 12 is pressed into firm contact with the lip of the receptacle mouth not only sealing the pad 9 from the interior or contents of the receptacle but also providing a secondary seal for the closure cap.

It will be obvious that the lining disk 12 may be a pad of yielding material, such as fibre or cork. However, should the contents of the receptacle consist of a volatile and gaseous substance, or a substance, such as oil, alcohol, liquids having an alcoholic content, food commodities, or a hydroscopic ingredient, that may have a deleterious effect by contact with the contents of the receptacle, or a contamination of the contents of the receptacle by the material of said disk. The disk 12 when consisting of cork or fibre is provided with a facing of gas impervious and acid resisting material, such as paper having a coating of a suitable varnish, or a metallic foil adhesively applied to the disk. The liner may comprise a disk of metallic foil, such as a disk of metallic foil having an adhesive coating or backing on one face and adhesively united with the rubber disk. The disk 12, however, is preferably of paper having a facing of suitable varnish and a paper felt backing to serve as a liner for the face of the disk within the bead of increased thickness.

The liner may be assembled or united with the rubber gasket when comprising a paper disk having a varnish facing by snapping the liner within the peripheral portion of increased thickness 12 and the liner held to the rubber gasket by the resiliency of the material thereof, and when the liner comprises a metallic foil disk it is assembled in and adhesively united with the gasket. In either case after the liner has been assembled on the rubber gasket, the assembled seal is engaged or assembled in the receptacle closure cap. Alternatively the rubber gasket may be first assembled in the closure cap and the liner assembled or united with the rubber gasket in the closure cap. When the closure cap is provided with an annular enlargement, as shown at 15 in Figure 6, the seal will be retained in the closure cap by the resiliency of the material of the rubber gasket. However, it will be obvious that the seal may be secured in the closure cap in the usual manner of securing seals in receptacle closure caps, as by an adhesive.

Figure 5:
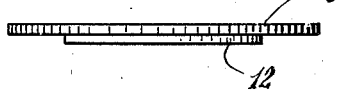
Figure 5 is a side elevation of a seal showing a modified embodiment of the invention.
Figure 6:
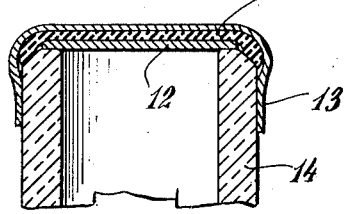
Figure 6 is a sectional view of the mouth portion of a receptacle and a closure with the seal of Figure 2 and showing the same in receptacle sealing position.

In the embodiment of the invention shown in Figures 5 and 6, the rubber gasket is in the form of a disk 9 of uniform thickness and of a diameter to overhang the liner 12 and embrace the periphery of the liner when the seal is assembled in a closure cap and the closure cap is applied to a receptacle, as shown in Figure 6, and thus providing a multiple seal for the receptacle, the liner 12 sealing the receptacle at one point and positively sealing the contents in the receptacle, and the rubber gasket serving as a backing, the same as in the Figure 1 arrangement, sealing the contents of the receptacle when comprising a volatile substance or hydroscopic ingredient against evaporation and prevent entrance of air or moisture to the receptacle.

The liner 12 in the Figure 5 embodiment is adhesively united with the gasket 9. It may comprise a pad of yielding material, such as fibre or cork, in which case it is provided with a facing of a gas impervious and acid resisting material, such as a paper disk having a suitable varnish coating on one face, or a metallic foil adhesively united with the pad, or it may comprise such a paper disk having a varnish coating or a metallic foil adhesively applied directly to the gasket 9.

Figure 7:
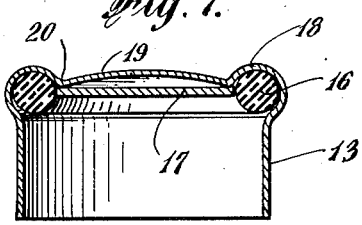
Figure 7 is a sectional view of a receptacle closure cap illustrating a further embodiment of the seal.
Figure 8:
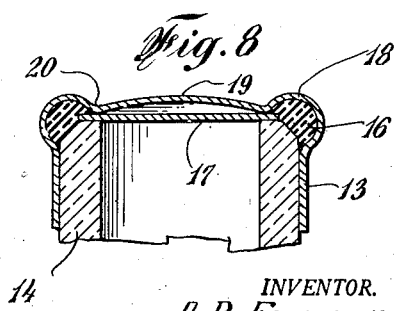
Figure 8 is a sectional view of the mouth portion of a receptacle with the closure cap and seal of Figure 7 applied thereto and showing the same in receptacle sealing position.

In the embodiment of the invention shown in Figures 7 and 8, the seal comprises an annular gasket 16 of resilient rubber embracing a liner 17. While liner 17 may comprise a paper disk having a paper felt backing and a suitable varnish coating or facing, or a facing of a metallic foil disk, and serve as a seal for the contents of the receptacle and seal the rubber gasket from the interior of the receptacle, the liner preferably comprises a pad of yielding material, such as cork or fibre, having a facing of gas impervious and acid resisting material, such as a paper disk having a varnish facing on one side, or a metallic foil disk adhesively applied to the pad. In the use of the form of seal of Figure 7 the receptacle closure cap preferably is provided with an outwardly pressed annular portion of arcuate shape in cross section at the juncture of the skirt with the disk portion of the cap, as at 18, and the portion 19 within and bounded by said arcuate portion arranged of crown form forming at the juncture thereof with the arcuate portion an annular inwardly extending projection, as at 20, and when the closure cap is drawn to the mouth of the receptacle, as shown in Figure 8, the cap projection 20 will impinge against and press the liner or pad 17 to the lip about the receptacle mouth, and the gasket 18 is pressed to the outer portion of the lip about the receptacle mouth and conformed to any irregularities in the receptacle mouth and thus positively sealing the contents of the receptacle from the atmosphere and the contents of the receptacle from the rubber gasket. In this arrangement the liner 17 is of a diameter slightly greater than the smallest inner diameter of the gasket 16 and is retained within the gasket against the end of the cap by the resilient contraction force of the material of the gasket, as in the arrangement of Figures 2 and 3.

While the invention is shown in Figure 1 as a lock-on cap having a locking shoulder of screw thread form and co-operating with a correspondingly formed locking shoulder on the receptacle to draw the receptacle closure to the mouth of the receptacle and lock it in said position, the closure cap may be of any other form and function to effect a multiple sealing of the receptacle from the atmosphere and sealing of the rubber gasket from the contents of the receptacle.

Having thus described my invention, I claim:

1. In a seal for receptacle closure caps, a composite pad comprising a paper disk and a disk of cushioning material having a diameter greater than the paper disk and the peripheral portion thereof encompassing material the periphery of the paper disk and yieldingly retaining the disks assembled, and said paper disk having on the exposed surface thereof a facing of material impervious to moisture and gas and acid resisting.

2. As an article of manufacture, a composite sealing pad for receptacle closure caps, comprising a disk of resilient material having a circumference greater than the outer circumference of the receptacle mouth to which the seal is to be applied and having at the periphery an annular receptacle lip engaging portion of increased thickness, and a disk facing of gas impervious and acid resisting material on the side of said resilient disk within the annular portion of increased thickness and to be exposed to the interior of the receptacle having a circumference greater than the interior circumference of the receptacle mouth and less than the exterior circumference thereof.

3. As an article of manufacture, a composite sealing pad for receptacle closure caps, comprising a disk of resilient material having a circumference as great as the outer circumference of the mouth of the receptacle to which the closure is to be applied and having an annular peripheral portion of increased thickness to contact with the receptacle mouth and said portion of increased thickness having an inner circumference greater than the inner circumference of the receptacle mouth, and a facing on said disk within the peripheral portion of increased thickness to engage the receptacle mouth and seal the disk from the interior of the receptacle.

4. A seal for receptacle closure caps, comprising a resilient rubber pad having a recess in one face, and a liner disk seated in the recess of and the pad of elastic material embracing the periphery of the liner disk to retain the liner disk assembled in the pad recess.

5. A seal for receptacle closure caps, comprising a disk of resilient material having a peripheral portion of circular form in cross section and increased thickness relative to the remainder of the disk, and a paper disk engaged within the peripheral portion of increased thickness of the resilient disk having on the exposed surface thereof a facing of gas impervious and acid resisting material and the resiliency of the material of the portion of increased thickness of the resilient disk retaining the paper disk within the recess contiguous to the resilient disk.

6. A seal for closure caps for receptacles, comprising a disk of resilient material, and a disk of lining material for a face of the disk of resilient material, said latter disk embracing the periphery of the lining disk and the resiliency of the material of the resilient disk uniting and holding the lining disk to the resilient disk.

7. In a receptacle closure cap, a liner comprising a disk of resilient material formed with a central recess and a marginal portion about the recess adapted to engage the lip about a receptacle mouth, and a disk-like facing positioned within the recess in the first disk and gripped at its periphery by a marginal portion of the recess wall.

8. As an article of manufacture, a liner for receptacle closure caps, comprising a pad of resilient material having a recess in one face, and a sheet-like member having a facing of gas impervious and acid resisting material positioned within said recess and retained therein by the surrounding wall of the recess resiliently embracing the peripheral portion of said sheet-like member.

9. A receptacle closure cap comprising a metallic shell having a top and a depending skirt, a sealing element of resilient material comprising an annular portion, and a lining disk of sheet-like material positioned centrally of said annular portion and having its periphery in resilient engagement with and gripped by the annular portion entirely around the circumference thereof, said lining disk being out of contact with the skirt portion of the cap shell prior to the application of the cap to a receptacle and held within the annular portion at such times by said resilient gripping engagement.

10. As an article of manufacture, lining and sealing means for use with a receptacle closure cap, said means comprising a member of resilient material and a disc of impervious sheet material assembled concentrically with respect thereto, said member comprising an annular portion surrounding said disk and embracing the circumferential edge thereof in gripping relation to hold the disk in place, a portion of said member being projected inwardly beyond said edge of the disk and contacting the adjacent face of the disk to assist in holding the disk in place.

11. As an article of manufacture, lining and sealing means for use with a receptacle closure cap, said means comprising a member of resilient material and a disk of impervious sheet material assembled concentrically with respect thereto, said member comprising an annular portion surrounding said disk and embracing the circumferential edge thereof in gripping relation to hold the disk in place, portions of said member being projected inwardly beyond said edge of the disk and contacting the upper and lower faces of the disk along lines at said edge to assist in holding the disk in place.

12. A receptacle closure cap comprising a metallic shell having a top and a depending skirt, a sealing element of resilient material comprising an annular portion having its inner circumferential surface shaped to provide a circumferential groove, and a lining disk of sheet-like material positioned centrally of said annular portion and having its peripheral edge disposed in said groove and gripped by said annular portion entirely around the circumference thereof, whereby said disk is held within the annular portion by said resilient gripping engagement.

13. A receptacle closure cap comprising a metallic shell having a top and a depending skirt, a resilient rubber sealing element comprising an annular portion, and a lining disk of sheet-like material positioned centrally of said annular portion and having its periphery in resilient engagement with and gripped by the annular portion entirely around the circumference thereof, said lining disk being out of contact with the skirt portion of the cap shell prior to the application of the cap to a receptacle and held within the annular portion at such times by said resilient gripping engagement.

14. As an article of manufacture, lining and sealing means for use with a receptacle closure cap, said means comprising a resilient rubber member and a disc of impervious sheet material assembled concentrically with respect thereto, said member comprising an annular portion surrounding said disk and embracing the circumferential edge thereof in gripping relation to hold the disk in place, a portion of said member being projected inwardly beyond said edge of the disk and contacting the adjacent face of the disk to assist in holding the disk in place.

ALAN R. FERGUSSON.